(12) United States Patent
Jang et al.

(10) Patent No.: US 11,700,461 B2
(45) Date of Patent: Jul. 11, 2023

(54) METHOD AND APPARATUS FOR PROCESSING IMAGE BASED ON OPTICAL COMMUNICATION, AND COMPUTER-READABLE RECORDING MEDIUM WITH PROGRAM THEREFOR

(71) Applicant: KOOKMIN UNIVERSITY INDUSTRY ACADEMY COOPERATION FOUNDATION, Seoul (KR)

(72) Inventors: Yeong Min Jang, Seoul (KR); Ahmed MD Faisal, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/562,712

(22) Filed: Dec. 27, 2021

(65) Prior Publication Data

US 2022/0210352 A1    Jun. 30, 2022

(30) Foreign Application Priority Data

Dec. 28, 2020   (KR) .................. 10-2020-0185073

(51) Int. Cl.
*H04N 25/531* (2023.01)
*H04B 10/116* (2013.01)

(52) U.S. Cl.
CPC ......... *H04N 25/531* (2023.01); *H04B 10/116* (2013.01)

(58) Field of Classification Search
CPC .. H04N 5/3532; H04N 5/2329; H04N 5/2357; H04N 25/531; H04N 23/689; H04N 23/745; H04B 10/116
See application file for complete search history.

(56) References Cited

FOREIGN PATENT DOCUMENTS

| KR | 10-1472583 B1 | 12/2014 |
|---|---|---|
| KR | 10-1501600 B1 | 3/2015 |
| KR | 10-1568943 B1 | 11/2015 |
| KR | 10-2016-0137342 A | 11/2016 |
| KR | 10-2017-0111460 A | 10/2017 |

OTHER PUBLICATIONS

Md. Faisal Ahmed, et al., "Experimental Demonstration of Continuous Sensor Data Monitoring Using Neural Network-Based Optical Camera Communications", IEEE Photonics Journal, vol. 12, No. 5, Oct. 2020. (Year: 2020).*
Md. Faisal Ahmed, et al., "Experimental Demonstration of Continuous Sensor Data Monitoring Using Neural Network-Based Optical Camera Communications", IEEE Photonics Journal, vol. 12, No. 5, Oct. 2020.

* cited by examiner

*Primary Examiner* — Nelson D. Hernández Hernández
(74) *Attorney, Agent, or Firm* — Nath, Goldberg & Meyer; Jerald L. Meyer; Stanley N. Protigal

(57) ABSTRACT

An optical communication-based image processing system is disclosed. The system may include a transmitter having at least one light emitting element and a receiver having a rolling shutter camera. As the system is provided, a rolling shutter effect may be improved.

17 Claims, 15 Drawing Sheets

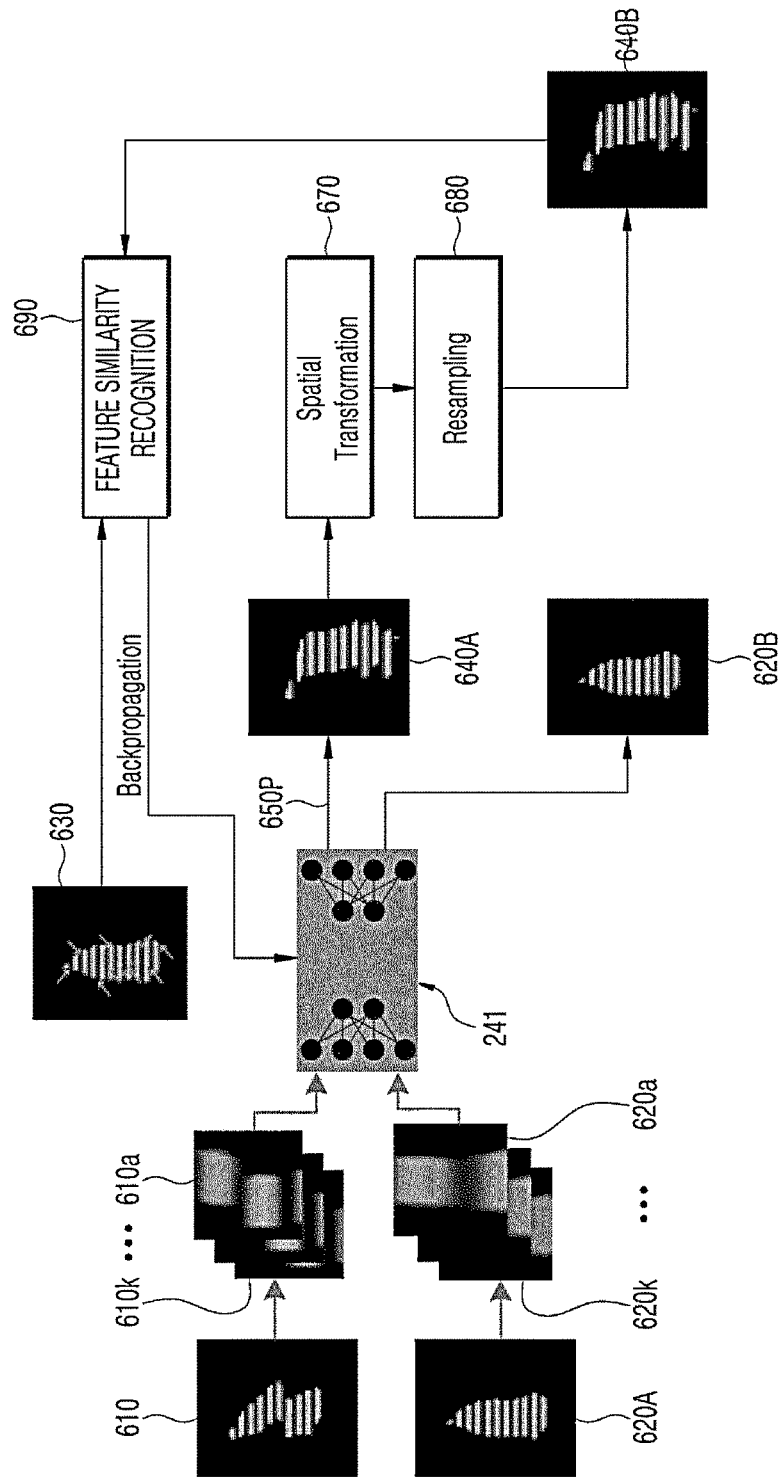

METHOD AND APPARATUS FOR PROCESSING IMAGE BASED ON OPTICAL COMMUNICATION, AND COMPUTER-READABLE RECORDING MEDIUM WITH PROGRAM THEREFOR

CROSS-REFERENCE TO RELATED APPLICATIONS

The present application claims priority under 35 U.S.C. 119(a) to Korean Patent Application No. 10-2020-0185073, filed on Dec. 28, 2020, which is incorporated herein by reference in its entirety.

BACKGROUND OF THE INVENTION

Field of the Invention

The present disclosure relates to an optical communication technology using a light emitting element as a transmitter and a camera having an image sensor as a receiver, and a technology of processing a received image based on optical communication. The present invention resulted from "Intelligent Internet of Energy (IoE) Data Research" of "University ICT Research Center Support Project" supported by the Ministry of Science and ICT (Project No.: 1711116158)

Description of the Related Art

Visible light communication (VLC), a representative lighting communication convergence technology, is a technology of performing wireless communication by loading information in light from a light source. Conventionally, light of a light source is received by a photodiode (PD), digital data 1 or 0 is detected according to on/off of the light source, and information is transmitted by combining the digital data.

Conventionally, a VLC system has been proposed to capture a plurality of light emitting diodes (LEDs) by a camera, instead of a photodiode, and extract data corresponding to on/off of the LEDs obtained on a frame basis in the camera. The VLC system using a camera is also called an optical camera communication (OCC) system in that it uses a camera instead of a photodiode as an optical receiver, and the IEEE 802.15.7a task group is attempting to standardize the OCC system.

An attempt has recently been made to apply a rolling shutter camera as the camera of the OCC system. The rolling shutter camera obtains an image on a frame basis by capturing an on/off image of LEDs in each row in image sensors arranged in a plurality of rows.

However, when moving LEDs are captured by the rolling shutter camera, an on/off image is captured on a row basis, thereby creating a step-shaped distorted image. Accordingly, there is a need for a method of overcoming the problem.

The above information is presented as background information only to assist with an understanding of the present invention. No determination has been made, and no assertion is made, as to whether any of the above might be applicable as prior art with regard to the present invention.

SUMMARY OF THE INVENTION

Therefore, the present invention has been made in view of the above problems, and it is an object of the present invention to provide an image processing system which corrects an image experiencing a rolling shutter phenomenon.

It is another object of the present invention to provide an optical communication-based image processing system which provides a flicker-free environment, while transmitting encoded data in different frequencies.

It is a further object of the present invention to provide an optical communication-based image processing system which reduces a bit error rate (BER) by using an image correction model.

In accordance with the present invention, the above and other objects can be accomplished by the provision of an optical communication-based image processing apparatus including a rolling shutter camera configured to capture an image of at least one light emitting element, when sensing data collected from at least one measurement sensor is encoded and transmitted through the at least one light emitting element, and a reception controller configured to input the captured light emitting element image to a pre-trained image correction model.

The image correction model may be configured to output a light emitting element image captured at a capturing time or a light emitting element image with a corrected distortion area, based on whether the rolling shutter camera has moved relative to the at least one light emitting element at the capturing time.

The reception controller may be configured to decode the encoded sensing data based on the output light emitting element image captured at the capturing time or the output light emitting element image with the corrected distortion area.

According to an embodiment, an optical communication-based image processing method includes capturing an image of at least one moving light emitting element by using a rolling shutter camera, when sensing data collected from at least one measurement sensor is encoded and transmitted through the at least one moving light emitting element, inputting the captured light emitting element image to a pre-trained image correction model, outputting a light emitting element image captured at a capturing time or a light emitting element image with a corrected distortion area from the image correction model, based on whether the rolling shutter camera has moved relative to the at least one light emitting element at the capturing time, and decoding the encoded sensing data based on the output light emitting element image captured at the capturing time or the output light emitting element image with the corrected distortion area.

Further, an optical communication-based image processing method according to an embodiment may be stored in a computer-readable recording medium recording a program to be executed on a computer.

The program may include an executable instruction which when executed by a processor, causes the processor to perform capturing an image of at least one moving light emitting element by using a rolling shutter camera, when sensing data collected from at least one measurement sensor is encoded and transmitted through the at least one moving light emitting element, inputting the captured light emitting element image to a pre-trained image correction model, outputting a light emitting element image captured at a capturing time or a light emitting element image with a corrected distortion area from the image correction model, based on whether the rolling shutter camera has moved relative to the at least one light emitting element at the capturing time, and decoding the encoded sensing data based on the output light emitting element image captured at the capturing time or the output light emitting element image with the corrected distortion area.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a diagram illustrating a process of training an image correction model according to an embodiment of the present invention;

DETAILED DESCRIPTION OF THE INVENTION

Figure 1:
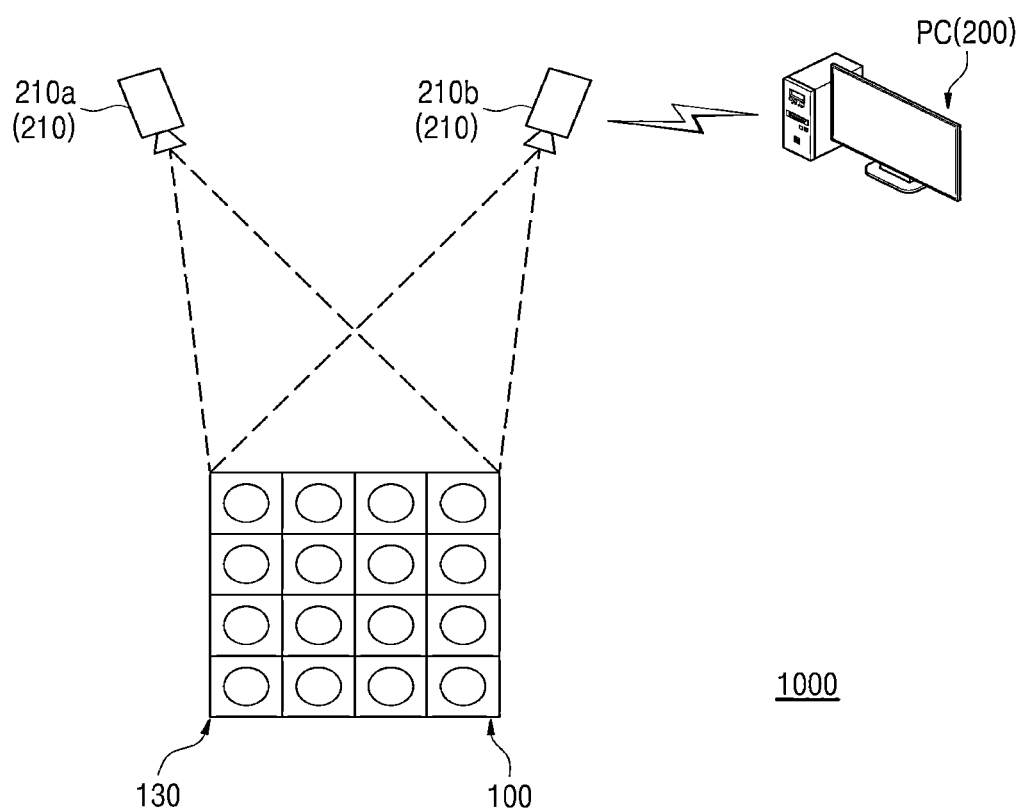
FIG. 1 is a diagram illustrating an optical communication-based image processing system according to an embodiment of the present invention.

Reference will now be made in detail to exemplary embodiments of the present invention, examples of which are illustrated in the accompanying drawings. The present invention may be implemented in various forms, and should not be interpreted as being limited to the embodiments described herein. In the drawings, the relative sizes of components, layers, and areas may be exaggerated, for clarity of description.

FIG. 1 is a diagram illustrating an optical communication-based image processing system 1000 according to an embodiment of the present invention.

The optical communication-based image processing system 1000 may include a transmitter 100 that optically transmits data and a receiver 200 that includes or communicates with a rolling shutter camera 210 having an image sensor. The receiver 200 may be implemented as an image processing device 200.

The transmitter 100 may optically output sensing data collected from one or more measurement sensors through one or more light emitting elements 130. The measurement sensors may include a temperature sensor and/or a humidity sensor, to which an embodiment is not limited.

There may be a plurality of light emitting elements 130 which may be arranged in a 4×4 array, an 8×8 array, or the like. Depending on an implementation, a single light emitting element may be configured. In an embodiment, the number of light emitting elements 130 may be changed based on the type of measurement sensors and the amount of data.

The plurality of light emitting elements 130 may optically transmit encoded sensing data collected from the measurement sensors. For example, the plurality of light emitting elements 130 may output a predetermined property value (e.g., a brightness value) including symbols. In an alternative embodiment, variable pulse width modulation (VPWM), which is a modulation scheme with a variable pulse width offset, may be applied as an encoding method.

The rolling shutter camera 210 may capture the plurality of light emitting elements 130, while moving from a first position 210a to a second position 210b. Because the rolling shutter camera 210 scans a frame row by row or column by column rather than a full frame at once as is done with a global shutter method, a geometric distortion called a rolling shutter phenomenon (or jello effect) appears in a captured image.

In an alternative or additional embodiment, even when the rolling shutter camera 210 in a fixed state captures the plurality of light emitting elements 130, the rolling shutter phenomenon may occur.

In an embodiment, the rolling shutter camera 210 may create the rolling shutter phenomenon depending on whether the rolling shutter camera 210 moves relative to the plurality of light emitting elements 130 at a capturing time. In addition, since the plurality of light emitting elements 130 are repeatedly on and off, a bright stripe and a dark stripe may alternate in an image captured by the rolling shutter camera 210. Herein, a relative movement refers to the movement of the rolling shutter camera 210 during capturing or the movement of the plurality of light emitting elements 130 during capturing, while the rolling shutter camera 210 is fixed. In the present disclosure, movement mainly means the above-described relative movement.

The image processing system 1000 according to an embodiment of the present invention may correct an image experiencing the rolling shutter phenomenon. Accordingly, even though a separate device (e.g., a global shutter camera) is not applied, an image free of the rolling shutter phenomenon may be output.

Figure 2:
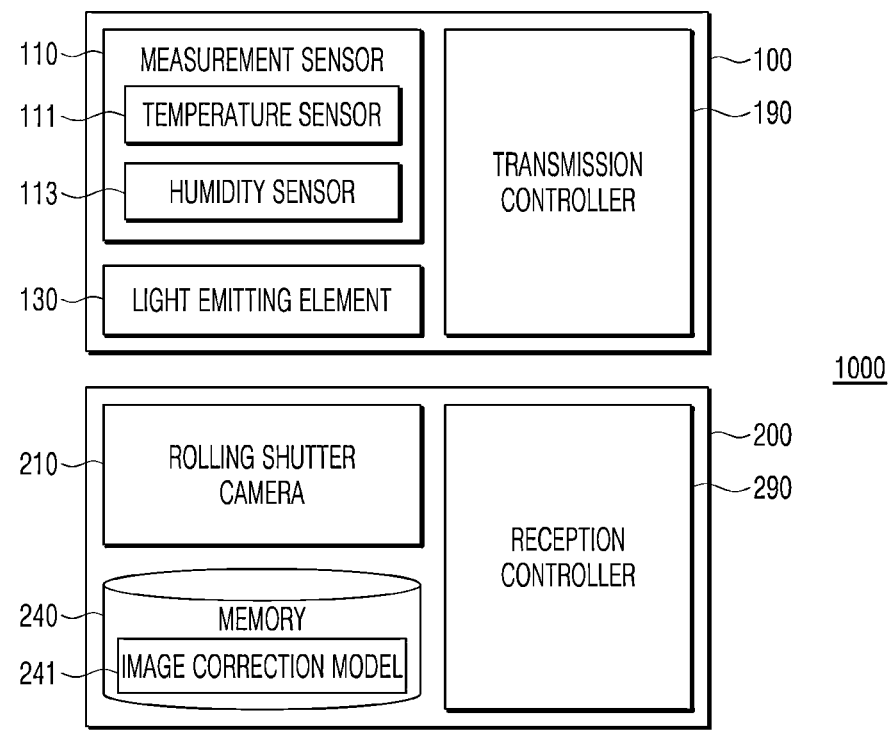
FIG. 2 is a system block diagram illustrating the configuration of an optical communication-based image processing system according to an embodiment of the present invention.

FIG. 2 is a system block diagram illustrating the configuration of the optical communication-based image processing system 1000 according to an embodiment of the present invention. Since each of the components illustrated in FIG. 2 is not compulsory for implementing the image processing system 1000, more or fewer components may be included in the image processing system 1000.

The image processing system 1000 may include the optical communication-based transmitter 100 and receiver 200. As described above, the receiver 200 may be used interchangeably with the image processing device 200.

The transmitter 100 is a module that transmits data and includes a measurement sensor 110, a light emitting element 130, and a transmission controller 190.

The measurement sensor 110 may include one or more measurement sensors that measure environmental data. Specifically, the measurement sensor 110 may include a temperature sensor 111 and a humidity sensor 113. However, as far as optical communication is possible, the measurement sensor 110 may include sensors that measure various environmental data, biometric data, spatial data, and so on.

One or more light emitting elements 130 may be implemented, and the number of light emitting elements 130 may be determined according to the amount of collected sensing data. The present invention will be described in the context of a plurality of emitting elements 130.

Each individual one of the light emitting elements 130 may be configured with an outer diameter of 3 millimeters, to which an embodiment is not limited.

The transmission controller 190 may encode sensing data collected from the measurement sensor 110 and transmit the encoded sensing data through the light emitting elements 130.

The transmission controller 190 may encode the sensing data collected from the measurement sensor based on VPWM.

The transmission controller 190 may generate the encoded data as a data packet and transmit the data packet through the light emitting elements 130. VPWM may configure a different LED on/off ratio for each pulse, like pulse width modulation (PWM).

The receiver 200 may include the rolling shutter camera 210, a memory 240 storing an image correction model 241, and a reception controller 290.

The rolling shutter camera 210 may capture the light emitting elements 130, while moving. In an alternative embodiment, the rolling shutter camera 210 in a fixed state may capture the light emitting elements 130 which are moving or fixed.

The memory 240 may store various types of information and the image correction model 241 which has already been trained. The pre-trained image correction model 241 may be implemented based on supervised learning, to which an embodiment is not limited.

The image correction model 241 may recognize the plurality of light emitting elements 130. That is, the image correction model 241 may recognize the number and arrangement direction of the light emitting elements 130. The image correction model 241 may be trained to correct a distortion area with the rolling shutter phenomenon in an image of the light emitting elements 130. In addition, the image correction model 241 may use a specific light emitting element as a reference light emitting element in order to recognize the arrangement direction of the plurality of light emitting elements 130.

An operation of the image correction model 241 according to various embodiments of the present invention will be described in detail with reference to FIGS. 6 and 7. In the following description, the reference numerals of FIG. 2 will also be referred to.

Figure 3:
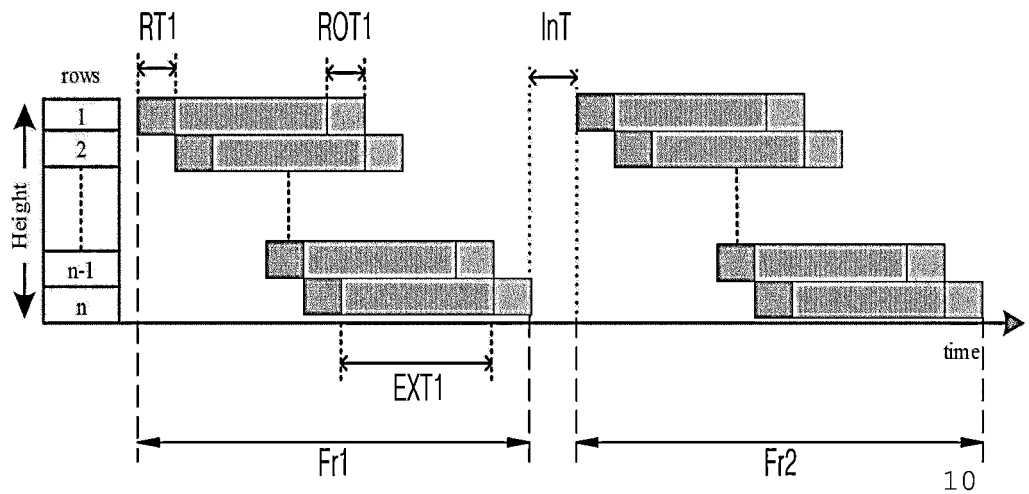
FIG. 3 is a diagram illustrating the operation principle of a rolling shutter camera according to an embodiment of the present invention.

FIG. 3 is a diagram illustrating an operation principle of the rolling shutter camera 210 according to an embodiment of the present invention.

The rolling shutter camera 210 may capture the plurality of light emitting elements 130 at a predetermined frame speed (e.g., 30 fps). The rolling shutter camera 210 may capture the plurality of light emitting elements 130 for each of frames Fr1, Fr2, . . . .

A shutting operation refers to blocking light at an image sensor, and the image sensor provided in the rolling shutter camera 210 may react to light, generate charge when receiving light, performs charge reset RT1 in an unnecessary period, and output the charge of a necessary period by readout ROT1. A time period from the reset RT1 to the readout ROT1 is referred to as an exposure time.

The brightness of a captured image may be determined according to the exposure time, and the intensities of a bright stripe and a dark stripe of the light emitting elements 130 may be determined according to the exposure time.

The rolling shutter camera 210 does not recognize a full frame for each of the frames Fr1 and Fr2. Rather, the rolling shutter camera 210 outputs charges accumulated in pixels column by column or row by row (e.g., from a first row to an $n^{th}$ row). Therefore, when the rolling shutter camera 210 captures the plurality of light emitting elements 130, while being shaken, the rolling shutter camera 210 may output an image including a distortion area.

Figure 4:
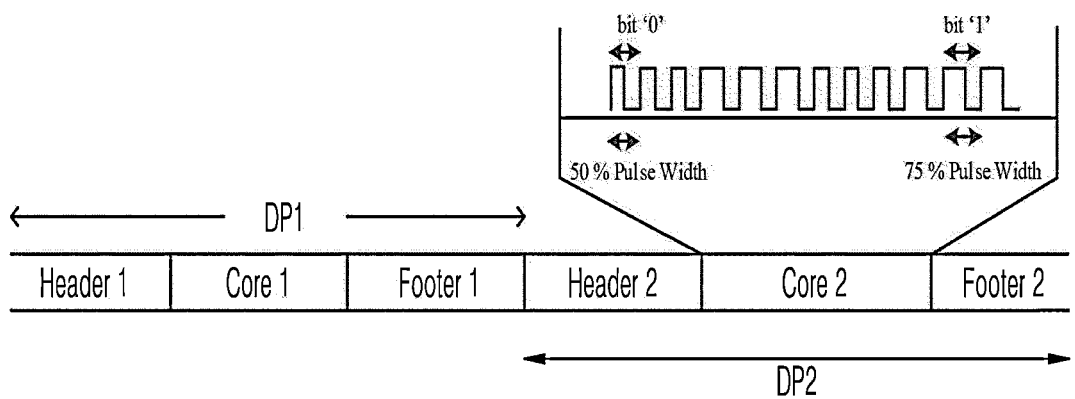
FIG. 4 is a diagram illustrating an operation of an optical communication-based transmitter, for encoding sensing data according to an embodiment of the present invention.

FIG. 4 is a diagram illustrating an operation of the optical communication-based transmitter 100, for encoding sensing data according to an embodiment of the present invention.

The transmission controller 190 of the transmitter 100 may encode sensing data collected from the measurement sensor 110 based on VPWM.

Specifically, the transmission controller 190 may encode data for each of data packets DP1 and DP2 and transmit the encoded data. Each of the data packets DP1 and DP2 may be generated in the order of header data, core data, and footer data. The header data and the footer data may include a series of data bits distinguished from the core data. For example, the header data may include "11100", and the footer data may include "10100", to which an embodiment is not limited.

The transmission controller 190 may delete one or more pulses having a duty cycle of 0% or 100% included in a data packet. Accordingly, a flicker phenomenon may be prevented from occurring in a period having consecutive duty cycles.

The transmission controller 190 may use a 50% duty cycle as "0" and a 75% duty cycle as "1". To exclude continuity of "0" or "1", the transmission controller 190 may fix the pulse width of an off part and variably adjust the pulse width of an on part, for a duty cycle at a predetermined position included in the data packet. Accordingly, the flicker phenomenon may be prevented in a period having consecutive duty cycles.

Figure 5A:
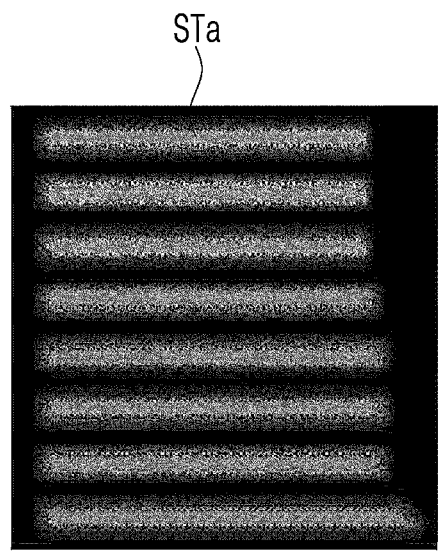
FIGS. 5A to 5C are diagrams referred to for describing a rolling shutter camera that captures light emitting elements in different frequencies according to an embodiment of the present invention.
Figure 5B:
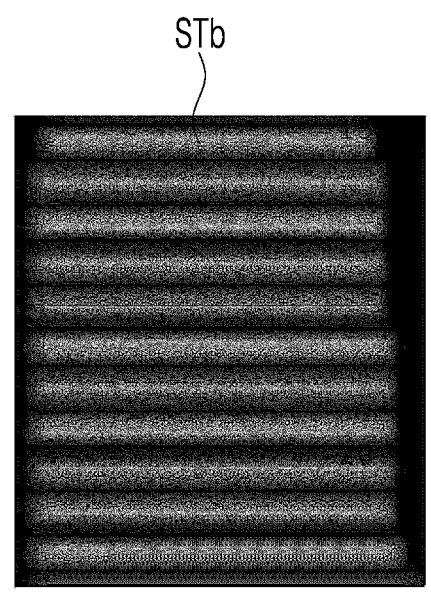
Figure 5C:
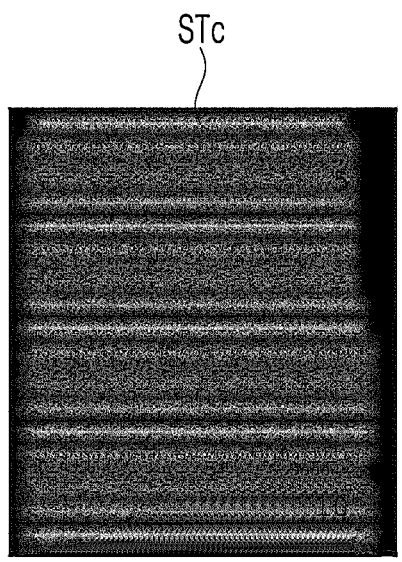

FIGS. 5A to 5C are diagrams referred to for describing the rolling shutter camera 210 that captures light emitting elements in different frequencies according to an embodiment of the present invention.

The rolling shutter camera 210 may capture the plurality of light emitting elements 130 by setting a resolution of 640×480, setting 500 Hz (FIG. 5A), 1000 Hz (FIG. 5B), and 2000 Hz (FIG. 5C), and setting exposure times of 0.65 ms, 1.25 ms, and 2.5 ms, to which an embodiment is not limited.

Referring to FIGS. 5A to 5C, it may be observed that the width of bright stripes increases as the frequency decreases (STa to STc).

The receiver 200 may perform Gaussian blur processing, gray scale format processing for removing a background, and the like on an image captured by the rolling shutter camera 210.

Figure 7:
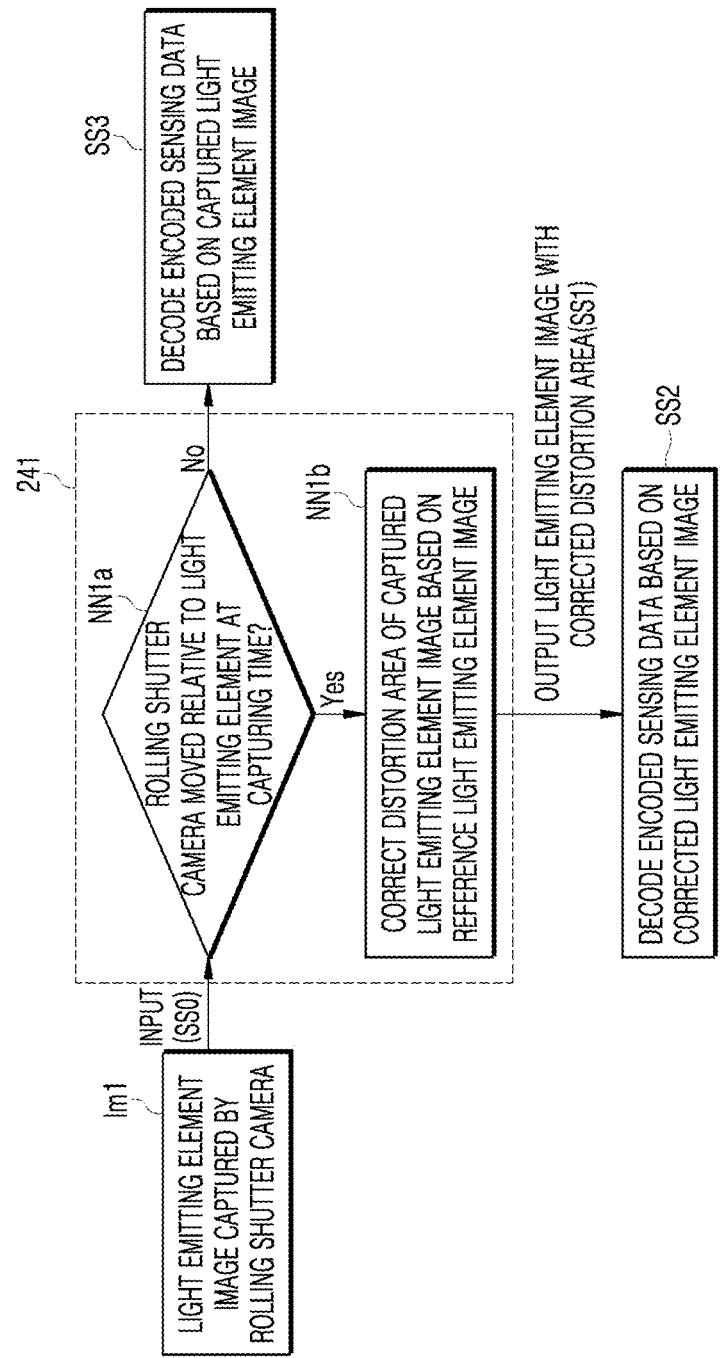
FIG. 7 is a flowchart illustrating a process of applying a pre-trained image correction model according to an embodiment of the present invention.

FIG. 6 is a diagram illustrating a process of training the image correction model 241 according to an embodiment of the present invention, and FIG. 7 is a diagram illustrating a process of applying the pre-trained image correction model 241 according to an embodiment of the present invention.

Referring to FIG. 6, the image correction model 241 may receive a light emitting element image captured by the rolling shutter camera 210 in a training step Tr. The light emitting element image may be an image 610 in which the rolling shutter phenomenon has occurred or an image 620A in which the rolling shutter phenomenon has not occurred.

The image correction model 241 may receive patches 610a to 610k and 620a to 620k of the light emitting element image, and may already store or receive one or more reference light emitting element images (or patch images). A reference light emitting element image may be a light emitting element image captured while all of the camera and the light emitting elements are stationary, and may be used as a reference for determining a relative movement of the captured light emitting elements and the accuracy of distortion correction.

The image correction model 241 may determine whether the rolling shutter camera 210 has moved relative to training light emitting elements at a capturing time, based on whether the edge shapes of adjacent stripes are uniform in the stripe pattern of the captured image of the training light emitting elements. In an embodiment, instead of the image correction model 241 controlled by the reception controller 290, the reception controller 290 may directly make the determination as to whether the rolling shutter camera 210 has made a relative movement.

The image correction model 241 may be trained to correct the distortion area of the image of the training light emitting elements, with respect to which the rolling shutter camera 210 has made a relative movement, based on the reference light emitting element image. The distortion area may include an area having the rolling shutter phenomenon (including an area in which stripes intersect with each other).

The image correction model 241 outputs a corrected image 640A and compares the output image 640A with a reference light emitting element image 630. When the similarity between the output image 640A and the reference light emitting element image 630 is less than a predetermined threshold, a parameter (a weight, a bias, or the like) of the image correction model 241 may be updated so that the output image 640A of the image correction model 241 becomes more similar to the reference light emitting element image 630 (backpropagation). In an embodiment, the parameter may be updated regardless of similarity. In an embodiment, the image correction model 241 may output information about the coordinate difference between an input image and an output image, without outputting the image.

When additional correction is required for the light emitting element image 640A in which the distortion area has been corrected, the reception controller 290 may perform spatial transformation and image resampling. In an embodiment, the reception controller 290 may compare a resampled light emitting element image 640B with the reference light emitting element image 630. When the similarity between the resampled light emitting element image 640B and the reference light emitting element image 630 is less than a predetermined threshold, the reception controller 290 may update the parameter of the image correction model 241.

The similarity may be obtained by comparing the positions of edges of stripe patterns in the captured light emitting element image and the reference light emitting element image, and the predetermined threshold may be, but not limited to, for example, 85%.

Referring to FIG. 7, when sensing data collected from one or more measurement sensors is encoded and transmitted through one or more light emitting elements in an application step APP, the image correction model 241 which has been completely trained receives a light emitting element image Im1 captured by the rolling shutter camera 210 in operation SS0.

The image correction model 241 may determine whether the rolling shutter camera 210 has moved relative to the light emitting elements at a capturing time in operation NN1a. Specifically, the image correction model 241 may determine whether the rolling shutter camera 210 has moved relative to the light emitting elements at the capturing time based on whether the edge shapes of adjacent stripes in a stripe pattern of the captured light emitting element image are uniform under the control of the reception controller 290.

When there is no relative movement in operation NN1a, the image correction model 241 outputs the captured light emitting element image as it is input, and the reception controller 290 may decode the encoded sensing data based on the captured light emitting element image in operation SS3.

When there is a relative movement in operation NN1a, the image correction model 241 may correct a distortion area of a training image of light emitting elements, relative to which the rolling shutter camera 210 has moved, based on a reference light emitting element image in operation NN1b. As described above, the distortion area refers to an area in which the edge shapes of stripes are not uniform.

The image correction model 241 may output the light emitting element image with the corrected distortion area in operation SS1, and the reception controller 290 may decode the encoded sensing data based on the corrected light emitting element image.

The image correction model 241 described above may include a neural network-based regression algorithm (e.g., one or more convolutional neural networks (CNNs)). In addition, the above-described reference light emitting element image or coordinate information corresponding to the reference light emitting element image may be used as a label of the neural network algorithm. In addition, the light emitting element image may be an image obtained by capturing one light emitting element, and may be an image obtained by capturing a plurality of light emitting elements.

FIGS. 8A to 8D are diagrams illustrating a process of capturing images of light emitting elements, recognizing the captured images, and processing the images according to an embodiment of the present invention.

Figure 8A:
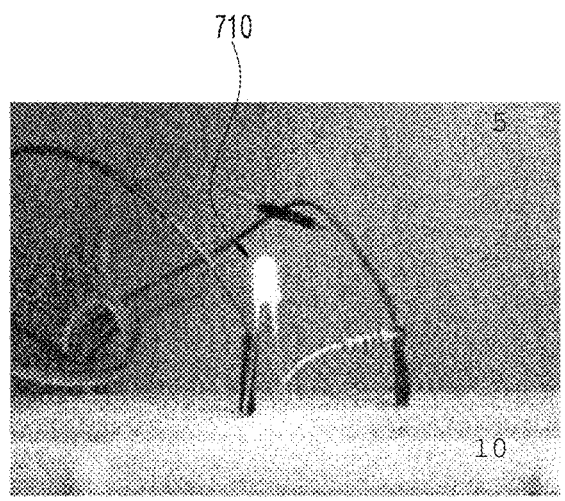
FIGS. 8A to 8D are diagrams illustrating a process of capturing images of light emitting elements, recognizing the captured images, and processing the images according to an embodiment of the present invention.
Figure 8B:
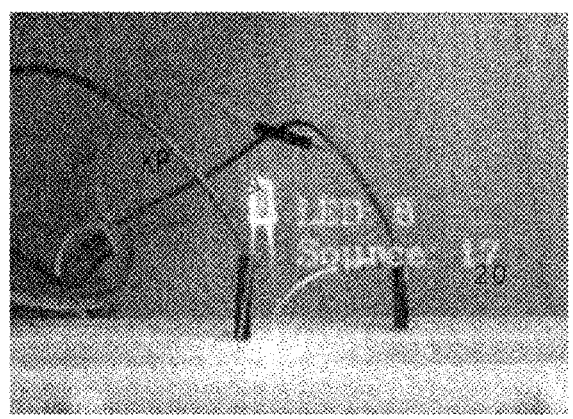

The receiver 200 may determine the number, arrangement direction, and size (width and height) of light emitting elements 710 captured by the rolling shutter camera 210 (FIG. 8A and FIG. 8B).

Figure 8C:
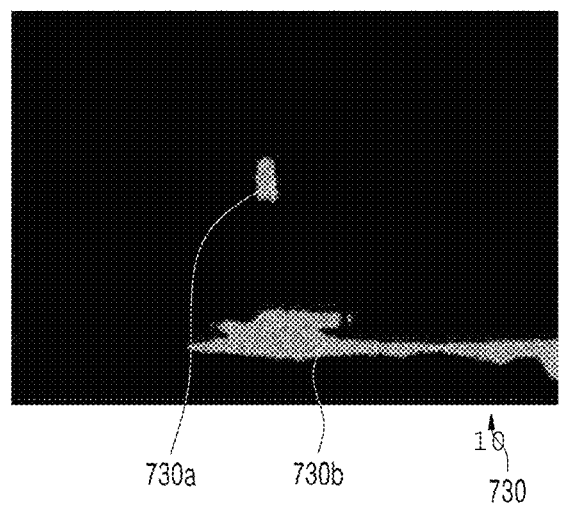
Figure 8D:
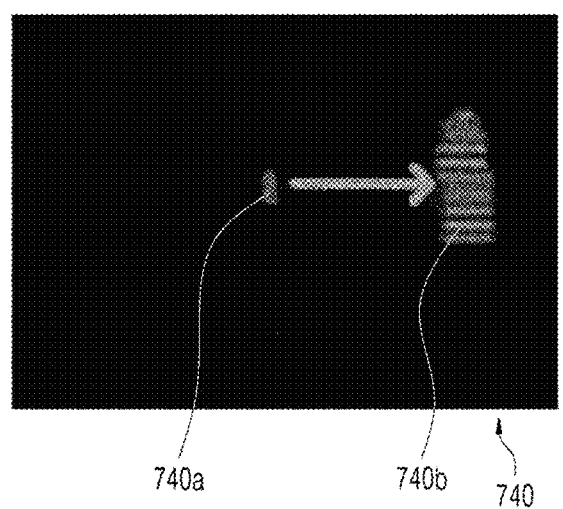

Then, the receiver 200 may cancel generated interference or noise to perform filter a stripe pattern (FIG. 8C and FIG. 8D).

In addition to a light emitting element transmitting an optical signal, a light emitting area resulting from light reflection may be observed in the captured light emitting element image, as illustrated in FIG. 8C. Although the reception controller 290 of the receiver 200 may detect the light emitting area in the captured image by using a region of Interest (ROI) detection algorithm, the reception controller 290 may determine a light-reflected area (also observed in FIG. 11A and FIG. 11B) as an ROI, in addition to an area in which an actual optical signal is transmitted.

The reception controller 290 may more accurately identify the area in which an actual optical signal is transmitted by an optical signal area detection algorithm that filters out this light-reflected area.

The optical signal area detection algorithm may be configured to detect at least one light emitting area in a captured image, and filter out the light emitting area, when a stripe pattern of the light emitting area does not change in consecutive image frames.

This relies on the property that in the case of an optical signal transmitted in a high frequency without the flickering effect, although a stripe pattern appears in one frame captured by the rolling shutter camera and changes in the next frame, such a stripe pattern change is not observed in reflected light.

When there are a plurality of light emitting elements, the reception controller 290 of the receiver 200 may control the rolling shutter camera 210 with a predetermined exposure time in which the plurality of light emitting elements 130 may be recognized.

In order to prevent interference between light emitting elements, the receiver 200 may set a small exposure time that enables light emitting elements to be recognized. When a plurality of light emitting elements 130 are cognized over time, the receiver may gradually increase the exposure time of the rolling shutter camera over time.

Figure 9A:
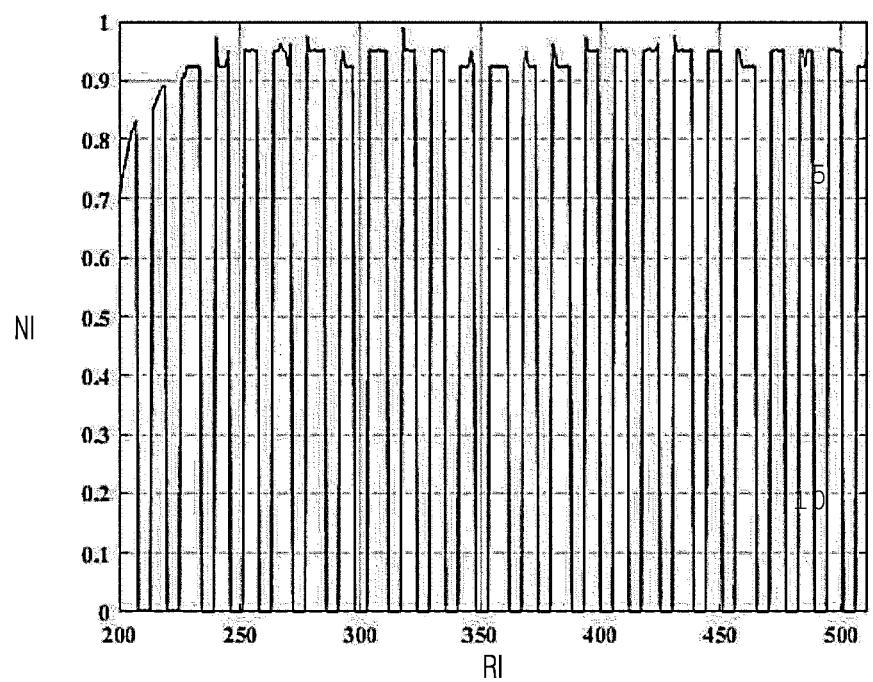
FIG. 9A is a graph illustrating a normalized intensity corresponding to a row index according to an embodiment of the present invention and FIG. 9B is a graph illustrating the number of bits recognized according to a distance.
Figure 9B:
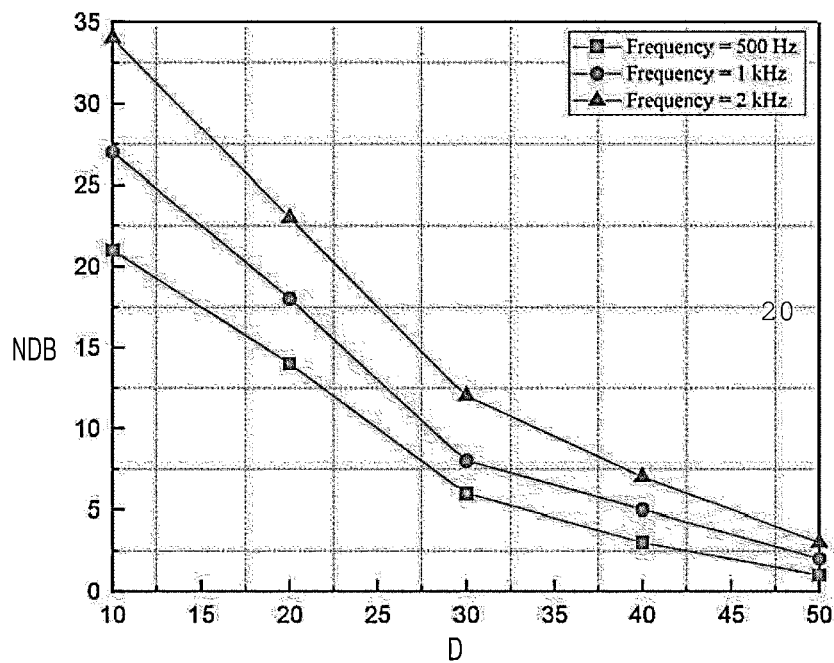

FIG. 9A is a graph illustrating a normalized intensity corresponding to a row index according to an embodiment of the present invention, and FIG. 9B is a graph illustrating the number of recognized bits according to a distance.

Referring to FIG. 9A, as the row index increases, the intensity appears in a stable pattern. Referring to FIG. 9B, as the distance increases, the number of recognized bits may decrease. The number of bits in a low frequency may be smaller than the number of bits in a high frequency.

Figure 10A:
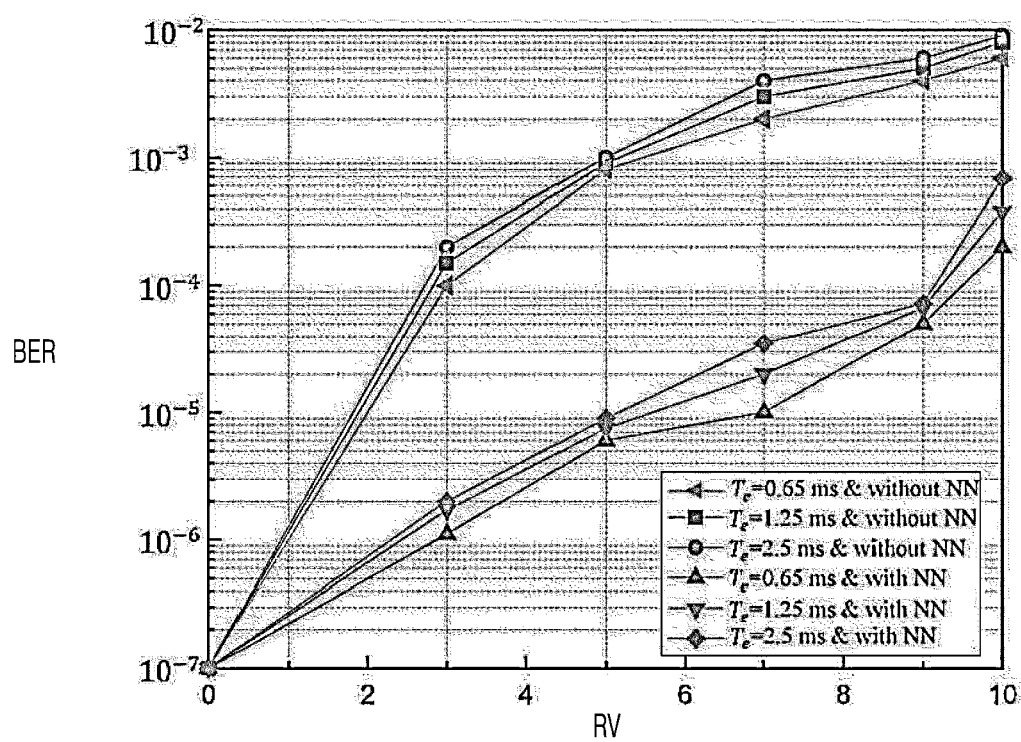
FIG. 10A is a graph illustrating a bit error rate (BER) according to a relative velocity according to an embodiment of the present invention.
Figure 10B:
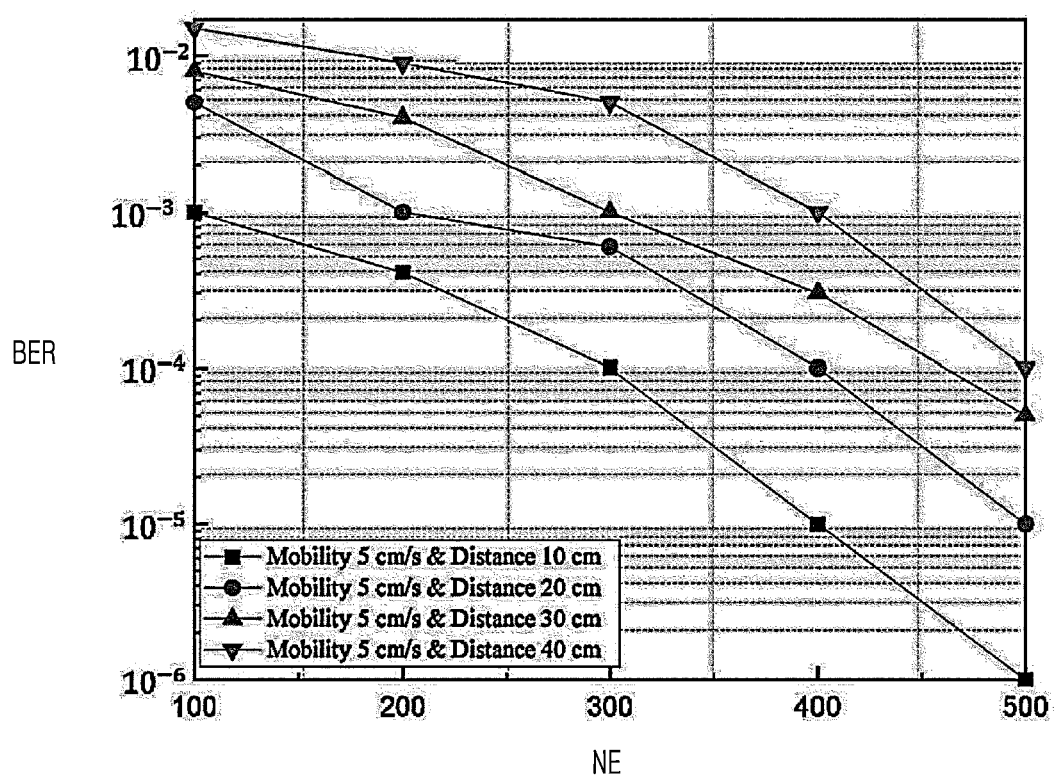
FIG. 10B is a graph illustrating a BER corresponding to the total number of epochs according to an embodiment of the present invention.

FIG. 10A illustrates a bit error rate (BER) according to a relative velocity according to an embodiment of the present invention, and FIG. 10B illustrates a BER corresponding to the total number of epochs according to an embodiment of the present invention.

Once an image correction model is applied, the BER is significantly reduced. Although a change of the BER according to an exposure time is not significant, the BER may be smaller as the exposure time is shorter.

Figure 11A:
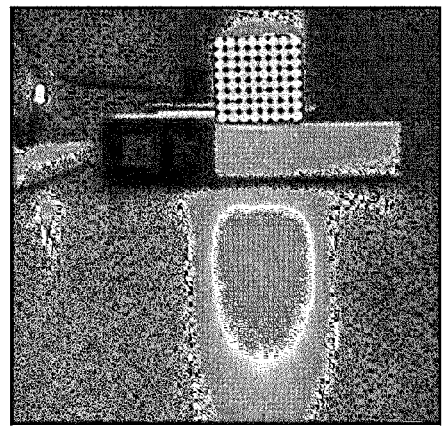
FIG. 11A, FIG. 11B, and FIG. 11C are diagrams illustrating a rolling shutter phenomenon in the case of using N×N light emitting elements.
Figure 11B:
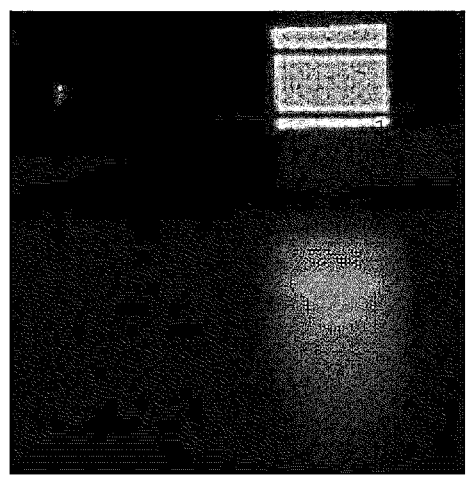
Figure 11C:
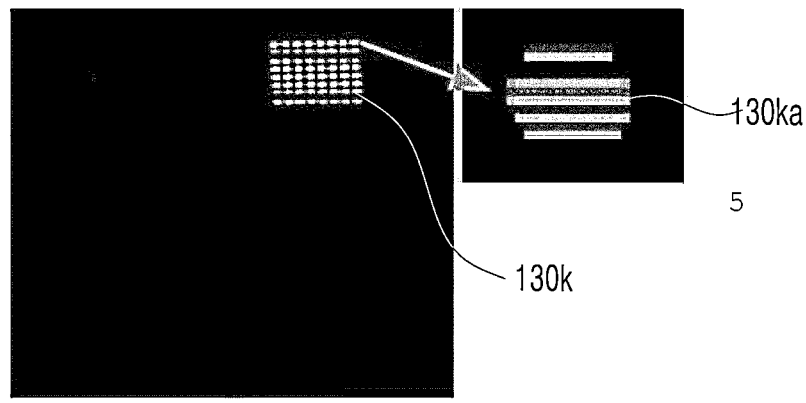
Figure 11D:
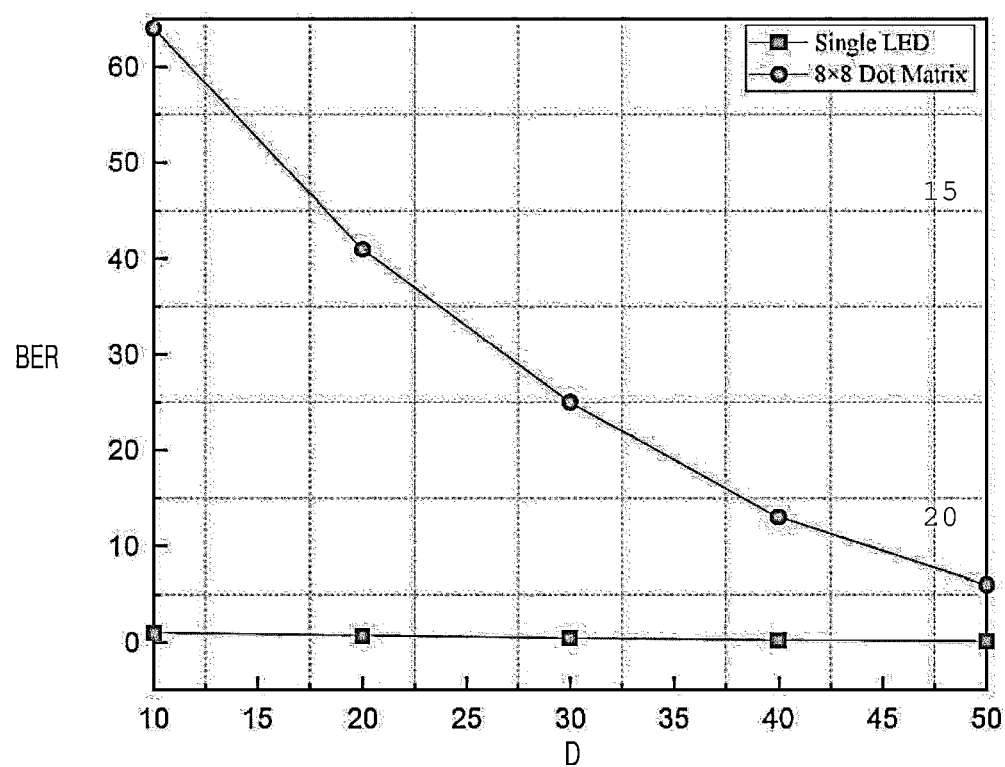
FIG. 11D is a diagram illustrating a data rate according to a distance.

FIG. 11A, FIG. 11B, and FIG. 11C are diagrams illustrating the rolling shutter phenomenon in the case of N×N light emitting elements, and FIG. 11D illustrates a data rate according to a distance. As the number of light emitting elements increases, the data rate naturally increases. In the case of 8×8 light emitting elements, up to 64 kbps may be observed.

Figure 12:
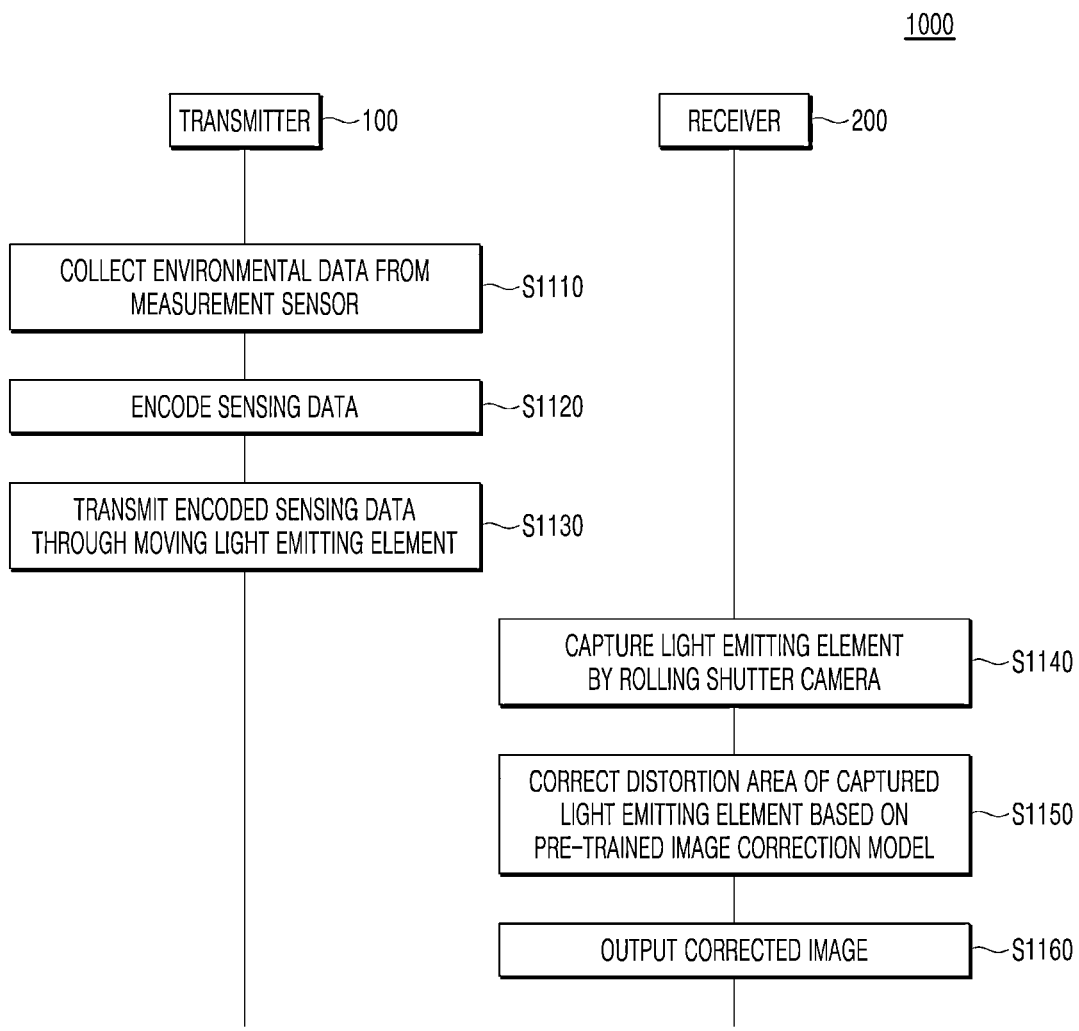
FIG. 12 is a flowchart illustrating an operation of an optical communication-based image processing system 1000 according to an embodiment of the present invention.

FIG. 12 is a flowchart illustrating an operation of the optical communication-based image processing system 1000 according to an embodiment of the present invention.

First, the transmitter 100 collects environmental data from measurement sensors in operation S1110, encodes the sensing data in operation S1120, and transmits the encoded sensing data through moving light emitting elements in operation S1130.

Upon receipt of sensing data which has been collected from one or more measurement sensors and encoded through one or more light emitting elements, the receiver 200 may capture moving light emitting elements by the rolling shutter camera in operation S1140, select a light emitting element area that transmits an optical signal in the image, and correct a distortion area in the captured light emitting element image in operation S1150. In this case, the receiver 200 may output the corrected image in operation S1160.

The optical signal area detection algorithm may be configured to detect at least one light emitting area in a captured image, and filter out the light emitting area, when a stripe pattern of the light emitting area is not changed in consecutive image frames.

More specifically, an optical communication-based image processing method may include capturing an image of at least one moving light emitting element by using a rolling shutter camera, when sensing data collected from at least one measurement sensor is encoded and transmitted through the at least one moving light emitting element, inputting the captured light emitting element image to a pre-trained image correction model, and when a light emitting element image captured at a capturing time or a light emitting element image with a corrected distortion area is output from the image correction model, based on whether the rolling shutter camera has moved relative to the at least one light emitting element at the capturing time, decoding the encoded sensing data based on the output light emitting element image captured at the capturing time or the output light emitting element image with the corrected distortion area.

Before receiving the light emitting element image in the application step, the receiver 200 may train the image correction mode.

The training may include receiving at least one training light emitting element image obtained by capturing at least one training light element through the rolling shutter camera and at least one reference light emitting element image, determining whether the rolling shutter camera has moved relative to the at least one training light emitting element at the capturing time, based on whether the shapes of edges of adjacent stripes in a stripe pattern of the captured training light emitting element image are uniform, and correcting a distortion area of the training light emitting element image captured by the rolling shutter camera which has moved relatively, based on the reference light emitting element image.

The training may further include, when a similarity between the training moving light emitting element image with the corrected distortion area and the reference light emitting element image is less than a predetermined threshold, updating a parameter of the image correction model is updated.

The above-described present invention may be implemented as computer-readable code in a medium to which a program is recorded. The computer-readable recording medium includes any type of recording device in which data readable by a computer system is stored. Examples of the computer-readable medium includes a hard disk drive (HDD), a solid state disk (SSD), a silicon disk drive (SDD), a read only memory (ROM), a random access memory (RAM), a compact disk-ROM (CD-ROM), a magnetic tape, a floppy disk, and an optical data storage device. Further, the computer may include the reception controller 290 of the receiver 200.

Specifically, the program may include an executable instruction which when executed by a processor, causes the processor to perform capturing an image of at least one moving light emitting element by using a rolling shutter camera, when sensing data collected from at least one measurement sensor is encoded and transmitted through the at least one moving light emitting element, inputting the captured light emitting element image to a pre-trained image correction model, outputting a light emitting element image captured at a capturing time or a light emitting element image with a corrected distortion area from the image correction model, based on whether the rolling shutter camera has moved relative to the at least one light emitting element at the capturing time, and decoding the encoded sensing data based on the output light emitting element image captured at the capturing time or the output light emitting element image with the corrected distortion area.

The processor may further perform training the image correction mode, before the inputting, which has been described before and thus will not be described herein.

As is apparent from the above description, according to various embodiments, the rolling shutter phenomenon may be corrected simply by image processing without applying a separate device (e.g., a global shutter camera), and flicker-free data transmission and reception may be performed regardless of a frequency.

While a specific embodiment of the present invention has been described and illustrated above, the present invention is not limited to the described embodiment. Those skilled in the art will understand that many modifications and variations can be made without departing from the scope and spirit of the present invention to achieve other specific embodiments.

What is claimed is:

1. An optical communication-based image processing apparatus comprising:
    a rolling shutter camera configured to capture an image of at least one light emitting element, when sensing data collected from at least one measurement sensor is encoded and transmitted through the at least one light emitting element; and
    a reception controller configured to input the captured light emitting element image to a pre-trained image correction model,
    wherein the image correction model is configured to output a light emitting element image captured at a capturing time or a light emitting element image with a corrected distortion area, based on whether the rolling shutter camera has moved relative to the at least one light emitting element at the capturing time,
    wherein the reception controller is configured to decode the encoded sensing data based on the output light emitting element image captured at the capturing time or the output light emitting element image with the corrected distortion area,
    and wherein the image correction model is configured to:
    receive at least one training light emitting element image obtained by capturing at least one training light element through the rolling shutter camera and at least one reference light emitting element image;
    determine whether the rolling shutter camera has moved relative to the at least one training light element at the capturing time, based on whether the shapes of edges of adjacent stripes in a stripe pattern of the captured training light emitting element image are uniform; and
    be trained to correct a distortion area of the training light emitting element image captured by the rolling shutter camera which has moved relatively, based on the reference light emitting element image.

2. The optical communication-based image processing apparatus according to claim 1, wherein when a similarity between the training light emitting element image with the corrected distortion area and the reference light emitting element image is less than a predetermined threshold, a parameter of the image correction model is updated.

3. The optical communication-based image processing apparatus according to claim 1, wherein the reception controller is configured to perform spatial transformation and resampling on the training light emitting element image with the corrected distortion area, for additional correction.

4. The optical communication-based image processing apparatus according to claim 1, wherein the sensing data collected from the at least one measurement sensor is encoded based on Variable Pulse Width Modulation (VPWM) and transmitted through the at least one light emitting element.

5. The optical communication-based image processing apparatus according to claim 4,
    wherein the encoded sensing data is generated as a data packet,
    wherein header data, core data, and footer data are sequentially arranged in the data packet,
    and wherein each of the header data and the footer data includes a series of data bits distinguished from the core data.

6. The optical communication-based image processing apparatus according to claim 5,
    wherein at least one pulse having a duty cycle of 0% or 100% included in the data packet is deleted,
    and wherein a pulse width of an off part is fixed and a pulse width of an on part is variably adjusted, for a duty cycle at a predetermined position in the data packet.

7. The optical communication-based image processing apparatus according to claim 1,
    wherein the at least one measurement sensor includes a temperature sensor and a humidity sensor,
    and wherein the number of light emitting elements that will be used for communication is determined based on the amount of data collected by the at least one measurement sensor.

8. The optical communication-based image processing apparatus according to claim 1,
    wherein when a plurality of light emitting elements exist, the reception controller is configured to control the rolling shutter camera to a predetermined exposure time during which the plurality of light emitting elements are recognizable,
    and wherein when the plurality of light emitting elements are recognized, the reception controller is configured to gradually increase the exposure time of the rolling shutter camera over time.

9. The optical communication-based image processing apparatus according to claim 1,
    wherein the reception controller is configured to detect at least one light emitting area in the captured image, and when a stripe pattern of the light emitting area is not changed in consecutive image frames, filter out the light emitting area.

10. The optical communication-based image processing apparatus according to claim 1, wherein the reception controller is configured to:
    determine whether the rolling shutter camera has moved relative to the at least one light emitting element at the capturing time, based on whether the shapes of edges of adjacent stripes in a stripe pattern of the captured light emitting element image are uniform;
    when the absence of a relative movement of the light emitting element is determined, decode the encoded sensing data based on the captured light emitting element image; and when the presence of a relative movement of the light emitting element is determined, decode the encoded sensing data based on a light emitting element image obtained by correcting a distortion area of the light emitting element image according to the image correction model trained based on a reference light emitting element image for the captured light emitting element.

11. An optical communication-based image processing method comprising:
capturing an image of at least one moving light emitting element by using a rolling shutter camera, when sensing data collected from at least one measurement sensor is encoded and transmitted through the at least one moving light emitting element;
inputting the captured light emitting element image to a pre-trained image correction model;
outputting a light emitting element image captured at a capturing time or a light emitting element image with a corrected distortion area from the image correction model, based on whether the rolling shutter camera has moved relative to the at least one light emitting element at the capturing time; and
decoding the encoded sensing data based on the output light emitting element image captured at the capturing time or the output light emitting element image with the corrected distortion area,
training the image correction mode, before the inputting, wherein the training comprises:
receiving at least one training light emitting element image obtained by capturing at least one training light element through the rolling shutter camera and at least one reference light emitting element image;
determining whether the rolling shutter camera has moved relative to the at least one training light emitting element at the capturing time, based on whether the shapes of edges of adjacent stripes in a stripe pattern of the captured training light emitting element image are uniform; and
correcting a distortion area of the training light emitting element image captured by the rolling shutter camera which has moved relatively, based on the reference light emitting element image.

12. The optical communication-based image processing method according to claim 11,
wherein the training further comprises, when a similarity between the training moving light emitting element image with the corrected distortion area and the reference light emitting element image is less than a predetermined threshold, updating a parameter of the image correction model is updated.

13. The optical communication-based image processing method according to claim 11,
wherein the sensing data collected from the at least one measurement sensor is encoded based on Variable Pulse Width Modulation (VPWM).

14. The optical communication-based image processing method according to claim 13,
wherein the encoded sensing data is transmitted as a data packet,
wherein header data, core data, and footer data are sequentially arranged in the data packet,
and wherein each of the header data and the footer data includes a series of data bits distinguished from the core data.

15. The optical communication-based image processing method according to claim 14,
wherein at least one pulse having a duty cycle of 0% or 100% included in the data packet is deleted,
and wherein a width of an off part is maintained and a width of an on part is variably adjusted, for a duty cycle at a predetermined position in the data packet.

16. The optical communication-based image processing method according to claim 11,
wherein the at least one measurement sensor includes a temperature sensor and a humidity sensor,
and wherein the number of light emitting elements that will be used for communication is determined based on the amount of data collected by the at least one measurement sensor.

17. A computer-readable recording medium recording a program to be executed on a computer,
wherein the program includes an executable instruction which when executed by a processor, causes the processor to perform:
capturing an image of at least one moving light emitting element by using a rolling shutter camera, when sensing data collected from at least one measurement sensor is encoded and transmitted through the at least one moving light emitting element;
inputting the captured light emitting element image to a pre-trained image correction model;
outputting a light emitting element image captured at a capturing time or a light emitting element image with a corrected distortion area from the image correction model, based on whether the rolling shutter camera has moved relative to the at least one light emitting element at the capturing time; and
decoding the encoded sensing data based on the output light emitting element image captured at the capturing time or the output light emitting element image with the corrected distortion area,
wherein the program further includes an executable instruction which causes the processor to train the image correction model, before the inputting,
wherein the training comprises:
receiving at least one training light emitting element image obtained by capturing at least one training light element through the rolling shutter camera and at least one reference light emitting element image;
determining whether the rolling shutter camera has moved relative to the at least one training light emitting element at the capturing time, based on whether the shapes of edges of adjacent stripes in a stripe pattern of the captured training light emitting element image are uniform; and
correcting a distortion area of the training light emitting element image captured by the rolling shutter camera which has moved relatively, based on the reference light emitting element image.

* * * * *